Patented Dec. 27, 1932

1,892,241

UNITED STATES PATENT OFFICE

GEORG KRÄNZLEIN, HEINRICH GREUNE AND HEINRICH VOLLMANN, OF HOCHST-ON-THE-MAIN, GERMANY, ASSIGNORS TO GENERAL ANILINE WORKS, INC., OF NEW YORK, N. Y., A CORPORATION OF DELAWARE

BENZANTHRONE DERIVATIVES AND PROCESS OF PREPARING THEM

No Drawing. Application filed March 27, 1928, Serial No. 265,220, and in Germany April 16, 1927.

Our present invention relates to benzanthrone derivatives and process of preparing them.

We have found that the hitherto unknown benzanthrone-peri-dicarboxylic acid and its derivatives and substitution products can be obtained by treating a compound of the general type:

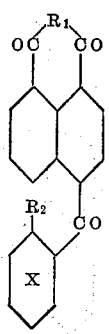

wherein $R_1$ stands for oxygen or N-aryl, $R_2$ stands for hydrogen or a halogen atom and the nucleus marked X may contain a substituent of the group consisting of alkyl, halogen and methoxy, in the presence or absence of a fusing agent or a diluent as, for instance, an alkali metal chloride, with a metal chloride capable of acting as a condensing agent as, for example, aluminum chloride or ferric chloride either per se or in the presence of an oxidizing agent such as, for instance, oxygen, chlorine, pyrolusite or the like.

The reaction which is advantageously carried out at a temperature exceeding 150° C., for example between 150° C. and 250° C., takes place according to the following formula:

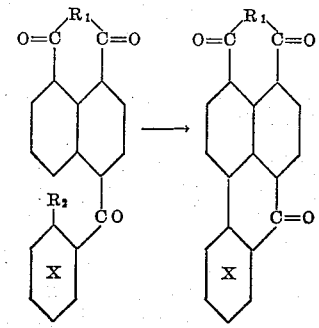

wherein $R_1$, $R_2$ and X have the above meaning. The new compounds thus obtained are valuable starting materials for preparing dyestuffs.

The following examples illustrate the invention, but they are not intended to limit it thereto, the parts being by weight:

(1) 10 parts of 4-benzoyl-1.8-naphthalic anhydride of the formula:

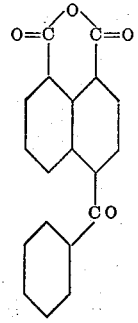

(obtainable in the manner indicated by Graebe in "Annalen der Chemie" volume 327, page 98) are intimately mixed with 50 parts of anhydrous aluminum chloride and the mixture is heated, while stirring, to about 190° C. to 210° C. for 6 hours. The melt is decomposed with a large quantity of water, boiled out with dilute hydrochloric acid, filtered by suction and washed. The residue is purified by dissolving it in an alkaline liquor or in a sodium carbonate solution and precipitating the filtrate by means of dilute hydrochloric acid. Thus the beautifully yellow colored benzanthrone-peri-dicarboxylic acid is obtained having the formula:

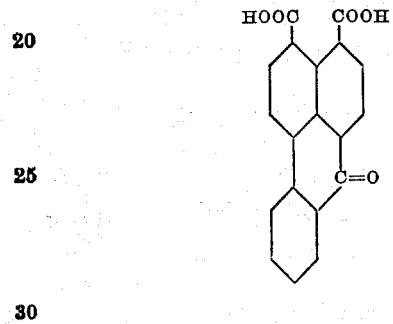

On recrystallizing it from boiling nitrobenzene its anhydride precipitates in the form of beautiful yellow needles having a melting point higher than 300° C. The anhydride dissolves in concentrated sulfuric acid to a red solution.

(2) 10 parts of 4-benzoyl-1.8-naphthalic anhydride are fused together with 70 parts of a mixture of about 57 parts of aluminium chloride and 13 parts of anhydrous sodium chloride and the whole is heated to 200° C. to 210° C. for 6 hours, while introducing oxygen. By working up the melted mass after it has cooled in the manner indicated in Example 1, there are obtained the benzanthrone-peri-dicarboxylic acid and therefrom its anhydride of a melting point over 300° C.

(3) 10 parts of 4-(ortho-chlorobenzoyl)-1.8-naphthalic anhydride (obtainable by oxydizing 5-ortho-chlorobenzoyl-acenaphthene) are melted together with 70 parts of a mixture of 54 parts of aluminium chloride and 16 parts of anhydrous potassium chloride and the mass is heated to 160° C. to 180° C. for 30 hours. On working up the melted mass in the manner indicated in Example 1, the benzanthrone-peri-dicarboxylic anhydride is obtained by way of the benzanthrone-peridicarboxylic acid.

(4) 20 parts of 4-para-chlorobenzoyl-1.8-naphthalic anhydride (obtainable by oxidizing 5-parachlorobenzoyl-acenaphthene) are melted together with 70 parts of a mixture of 57 parts of aluminium chloride and 13 parts of anhydrous sodium chloride and this mass is heated to 200° C. to 205° C., for 8 hours while adding by portions 3 parts of powdered pyrolusite. On working up the melted mass in the manner indicated in Example 1 and recrystallizing the product from nitrobenzene, there is obtained the chlorobenzanthrone-peri-dicarboxylic anhydride melting at over 300° C. and having the following constitution:

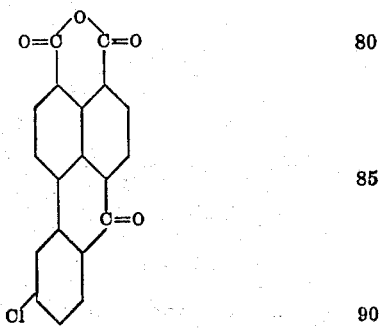

It is soluble in concentrated sulfuric acid to a beautiful red solution.

(5) 10 parts of 4-benzoyl-1.8-naphthalic-acid-N-phenylimide of the formula:

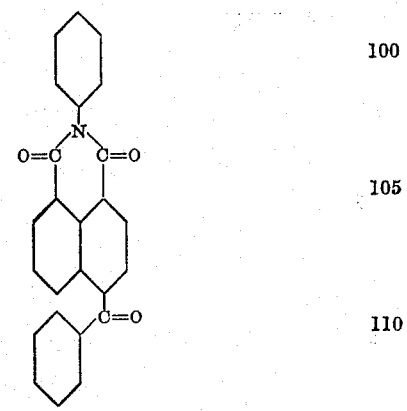

(obtainable by condensing 4-benzoyl-1.8-naphthalic anhydride with aniline) are intimately mixed with 70 parts of sodium-aluminium chloride and the mixture is heated to 180° C. to 195° C. until the formation of the benzanthrone is complete. The melt is decomposed with water and dilute hydrochloric acid, the residue is filtered by suction, washed until neutral and vatted with alkali and hydrosulfite in order to purify it. From the orange-red vat solution the benzanthrone-peri-dicarboxylic acid-N-phenylimide is precipitated by blowing air into the solution, filtered by suction, washed until neutral and recrystallized from an organic solvent. It crystallizes from glacial acetic acid in the form of yellow needles melting at over 300° C. It is soluble in concentrated sulfuric acid to a red solution. It has probably the following formula:

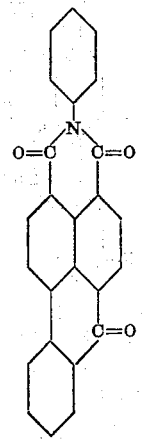

We claim:

1. The process which comprises treating with a metal chloride capable of acting as a condensing agent at an elevated temperature a compound of the following formula:

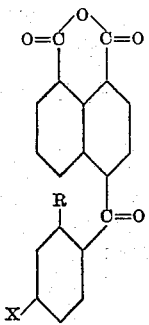

wherein R stands for hydrogen or a halogen atom and X for hydrogen or chlorine.

2. The process which comprises treating with aluminium chloride in the presence of a diluent and of an oxidizing agent at a temperature of about 150° C. to 250° C. a compound of the following formula:

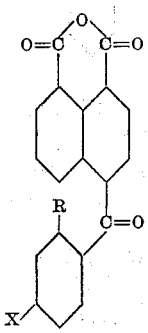

wherein R stands for hydrogen or a halogen atom and X for hydrogen or chlorine.

3. The process which comprises treating the compound of the formula:

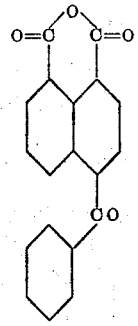

with a metal chloride capable of acting as a condensing agent at an elevated temperature.

4. The process which comprises treating the compound of the formula:

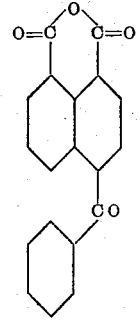

with aluminium chloride in the presence of a diluent and of an oxidizing agent at a temperature of about 150° C. to 250° C.

5. The process which comprises melting the compound of the formula:

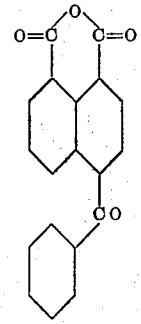

with aluminium chloride in the presence of sodium chloride and heating the mass so prepared for several hours to 200° C. to 210° C. while introducing oxygen.

6. As a new product, the compound of the following formula:

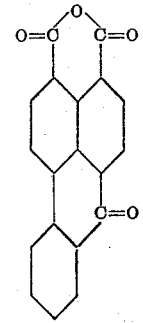

crystallizing from nitrobenzene in the form of yellow needles which melt at over 300° C. and dissolve in concentrated sulfuric acid to a red solution.

7. The process which comprises treating with a metal chloride capable of acting as a condensing agent at an elevated temperature a compound of the following general formula:

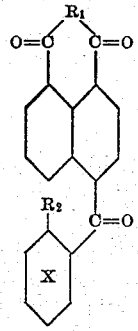

wherein $R_1$ stands for oxygen or a N-aryl group, $R_2$ stands for hydrogen or a halgen atom and the nucleus marked X may contain a substituent of the group consisting of alkyl, halogen and methoxy.

8. The process which comprises treating with aluminium chloride in the presence of a diluent and of an oxidizing agent at a temperature of about 150° C. to 250° C. a compound of the following general formula:

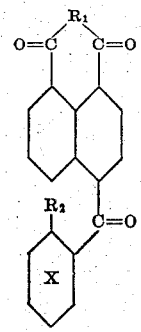

wherein $R_1$ stands for oxygen or a N-aryl group, $R_2$ stands for hydrogen or a halogen atom and the nucleus marked X may contain a substituent of the group consisting of alkyl, halogen and methoxy.

9. As new products, the compounds of the following general formula:

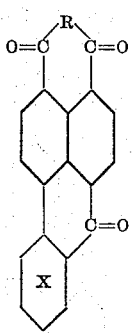

wherein R stands for oxygen or a N-aryl group and the nucleus marked X may contain a substituent of the group consisting of alkyl, halogen and methoxy.

10. As new products, the compounds of the following general formula:

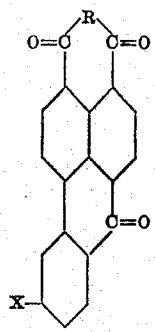

wherein R stands for oxygen or the N-phenyl group and X stands for hydrogen or chlorine.

11. As a new product, the compound of the following formula:

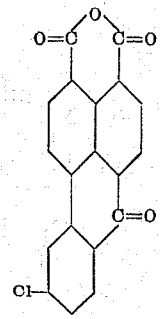

crystallizing from nitrobenzene, melting at over 300° C. and being soluble in concentrated sulfuric acid to a red solution.

12. As a new product, the compound of the following formula:

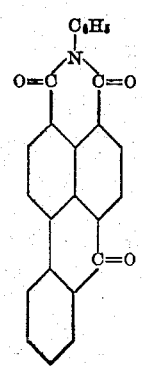

crystallizing from glacial acetic acid in the form of yellow needles melting at over 300° C. and dissolving in concentrated sulfuric acid to a red solution.

In testimony whereof, we affix our signatures.

GEORG KRÄNZLEIN.
HEINRICH GREUNE.
HEINRICH VOLLMANN.